(12) United States Patent
Langley

(10) Patent No.: US 10,523,817 B1
(45) Date of Patent: *Dec. 31, 2019

(54) METHODS FOR LINKING RECOMMENDATIONS

(71) Applicant: United Services Automobile Association ("USAA"), San Antonio, TX (US)

(72) Inventor: Guy R. Langley, San Antonio, TX (US)

(73) Assignee: United Services Automobile Association ("USAA"), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/373,142

(22) Filed: Apr. 2, 2019

Related U.S. Application Data

(63) Continuation of application No. 16/154,998, filed on Oct. 9, 2018, now Pat. No. 10,298,761, which is a continuation of application No. 14/854,559, filed on Sep. 15, 2015, now Pat. No. 10,122,856.

(60) Provisional application No. 62/051,722, filed on Sep. 17, 2014.

(51) Int. Cl.
*H04M 3/00* (2006.01)
*H04M 3/51* (2006.01)

(52) U.S. Cl.
CPC ....... *H04M 3/5191* (2013.01); *H04M 3/5133* (2013.01)

(58) Field of Classification Search
CPC ............ H04M 3/5191; H04M 3/5183; H04M 3/5175; H04M 3/5166; H04M 3/5232; H04M 3/523
USPC .......................... 379/265.01–265.02, 265.09
See application file for complete search history.

(56) References Cited

U.S. PATENT DOCUMENTS

| | | |
|---|---|---|
| 8,072,926 B1 | 12/2011 | Billman |
| 2006/0031077 A1 | 2/2006 | Dalton et al. |
| 2013/0136253 A1 | 5/2013 | Liberman Ben-Ami et al. |
| 2013/0343534 A1 | 12/2013 | Nguyen et al. |
| 2014/0245328 A1 | 8/2014 | Morisaki et al. |
| 2015/0278534 A1 | 10/2015 | Thiyagarajan et al. |

*Primary Examiner* — Rasha S Al Aubaidi
(74) *Attorney, Agent, or Firm* — Locke Lord LLP; Christopher J. Capelli

(57) ABSTRACT

A computer-implemented method and system for enhancing interaction between a customer and a customer service representative of a company. Data related to the customer is stored and received at a computer operated by the company, wherein the data can include a customer name, a customer address and a customer number. A telephonic interaction is preferably commenced between the customer and the customer service representative and a Web session is preferably commenced on a Web site for a client computer of the customer service representative. At least a part of the data is displayed on a workstation of the customer service representative as a first Web page, wherein the first Web page includes at least one selectable link to a second Web page. At least one selectable link is selected by the customer service representative to display the second Web page.

13 Claims, 16 Drawing Sheets

Understand Module

UNDERSTAND

522

| | Time | Mood | Interest |
|---|---|---|---|
| Reason for Call | Lots | Positive | High |
| Invest money (from voiceline) | | | |

Interaction Synthesis
Careful financial planner for his age.
Wants to support his childern's education Current Aspirations
Take a vacation to the lake this summer Concerns
Can his family afford his wife to stay home with the kids?

Interaction History

LAST 6 MONTHS  Name: ?  Mood: Positive  Interest: High
Call Reason: 529 for Sally
Life Events Captured:
• Expecting new baby!
Actions:
• Started and funded a 529 with $1600
• Change payment day for auto loan to 3rd of the month LAAST YEAR
Online: Auto Circle
Member Actions: Compated prices on:
• Auti TT 2010
• Honda Odyssey 2004
• Ford Focus 2007

Recent Life Events

Call Notes
Calling from the road  Away from computer

FIG. 5D

Conversation Support

CONVERSATION SUPPORT

What do you need help talking about?

Why you need life insurance
- "If you were to lose your job tomorrow, how would you supoort your family?"

Why Sam needs a 529 college savings account
- "Next to saving for retirement, your biggest financial challenge is probably saving for your kids' college education."

Options Explorer, Fulfillment, and Product Details

OPTIONS EXPLORER | Start Screen Sharing

INVESTMENT TYPES

✓ Mutual Funds  IRAs
 College Savings  Annuities
 CDs

FUND FILTERS

✓ Risk tolerance
0   1   2   ●3   4   5   6   7

✓ Past performance (Upper average)
Below ─────────────●───── Above

✓ Time horizon
0  ●1-5 yrs  10-20 yrs  20-50 yrs  50+

✓ Fund yield
0   2   ●4   6   8   +10%

Generate recommendations for Dale

USAA INVESTMENT OPTIONS

Mutual Funds

▾ sort by: Recommendation

● Balanced Strategy Fund    Compare    Performance ★★★
Suitable as core investment in many portions                14.18 | ↓ .08
Reduces risk by shifting between stocks bonds and cash
Long-term growth potential and regular income payments

| Summary | Performance | Ratings | Holdings | Management |

☒ Moderate
The fund's investment objective is high total return with
reduced risk over time through an asset allocation strategy
that seeks a combination of long-term growth or capital
and current income. Using preset target ranges, the fund
invests its assets in a combination of stocks on the one
hand and bonds and money market instruments on the
other.

Invest in Fund
   Amount         $6000
   Funding Account   USAA Checking ▾
   Transfer Date    April 15, 2011
   Summary via:    ✓ Email (preferred)
                    SMS Funds in Category:    911
Lipper Category:      Mixed-Asset
                      Target Alloc
                      Moderate Funds
Lipper Category
Expense:              0.96%
Newspaper Listing:    BalStra

[ Transfer Funds & Send Summary ]

612

FIG. 5I

METHODS FOR LINKING RECOMMENDATIONS

CROSS REFERENCE TO RELATED APPLICATIONS

This application is a Continuation of U.S. patent application Ser. No. 16/154,998 filed Oct. 9, 2018, which is incorporated herein by reference in its entirety.

FIELD OF THE INVENTION

The present technology relates to improving customer interactions and easing such interactions for the customer service representative, and more particularly, to providing Web pages for review by the customer service representative and depending upon interaction with the customer providing links for selection by the customer service representative to generate additional Web pages for related goods and services.

BACKGROUND OF THE INVENTION

Customer service representatives are often responsible for a wide variety of tasks. In addition to being proficient in accomplishing particular tasks like updating addresses or other status changes, providing new or updated quotes, responding to billing inquiries, cancelling and renewing services, and entering data related to the customer, the customer service representative is expected to be more than cordial, pleasant, engaging and generally charming.

To support customer service representatives, each has a workstation. The customer service representative relies on their workstation to provide them with information quickly in order to maintain conversational flow with the customer. Despite tremendous computing power and the latest technology, delays are inevitably introduced by the support technology. Additional delays are also created by the customer service representative, whether it be the customer service representative's natural speech cadence, thought process, deliberation over a selection, or simple consideration of what to say or type next. As a result, everyone is familiar with the unproductive long uncomfortable pause.

When dealing with a customer who has researched products and services in advance, commonly by using the Internet, further difficulty arises in that the customer might not understand or clearly communicate the results of her research to the customer service representative. Often, a call to the company results from the customer's dissatisfaction and frustration with the company's Web site.

Under such circumstances, customer service representatives are expected to still mine the customer for opportunities to make new and additional sales of products and services, often referred to as "upselling." This is a difficult task. However, upselling is critical to expanding revenue with a targeted group, which is predisposed to using the company for goods and services (e.g., existing customers or potential customers who have already reached out to the company).

It is understandable that with all that a customer service representative is expected to juggle, that presenting a warm, confident, informed face to the customer is challenging. Yet, this is exactly what is expected. Thus, a need exists to provide support to the customer service representatives to allow them to represent the company as well as possible.

In response to these challenges, several approaches have been developed to improve customer service. U.S. Pat. No. 8,588,395, issued on Nov. 19, 2013, collects data from a plurality of calls to generate reports. Upon review of the reports, alerts are generated to identify poorly performing units. Other attempts at improvement look to remove, or at least minimize, the role of the customer service representative herself. For example, U.S. PG Pub. No. 2012/0076283, published on Mar. 29, 2012, creates a smart chat room in which customers can be directed to an appropriate Frequently Asked Question (FAQ) or particular display that may assist the customer without interaction with a customer service representative. None of these teachings smartly assist the customer service representative with the tasks of upselling.

Referral of services or additional information from the customer service representative to the customer is profitable and desirable. Thus, there is an unmet need to provide companies, such as insurance companies, the ability to enhance interactions between their customers and customer service representatives to facilitate providing useful recommendations to the customers that lead to additional sales.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer-implemented method and system for enhancing interaction between a customer and a customer service representative of a company. is described in which data related to the customer is stored and received at a computer operated by the company, wherein the data can include a customer name, a customer address and a customer number. A telephonic interaction is preferably commenced between the customer and the customer service representative and a Web session is preferably commenced on a Web site for a client computer of the customer service representative. At least a part of the data is displayed on a workstation of the customer service representative as a first Web page, wherein the first Web page includes at least one selectable link to a second Web page. At least one selectable link is selected by the customer service representative to display the second Web page.

BRIEF DESCRIPTION OF THE DRAWINGS

So that those having ordinary skill in the art, to which the present embodiments pertain, will more readily understand how to employ the novel system and methods, certain illustrated embodiments thereof will be described in detail herein-below with reference to the following drawings.

FIGS. 5B-I are views of portions of the Web pages of FIG. 5A.

DETAILED DESCRIPTION OF CERTAIN EMBODIMENTS

Figure 1:
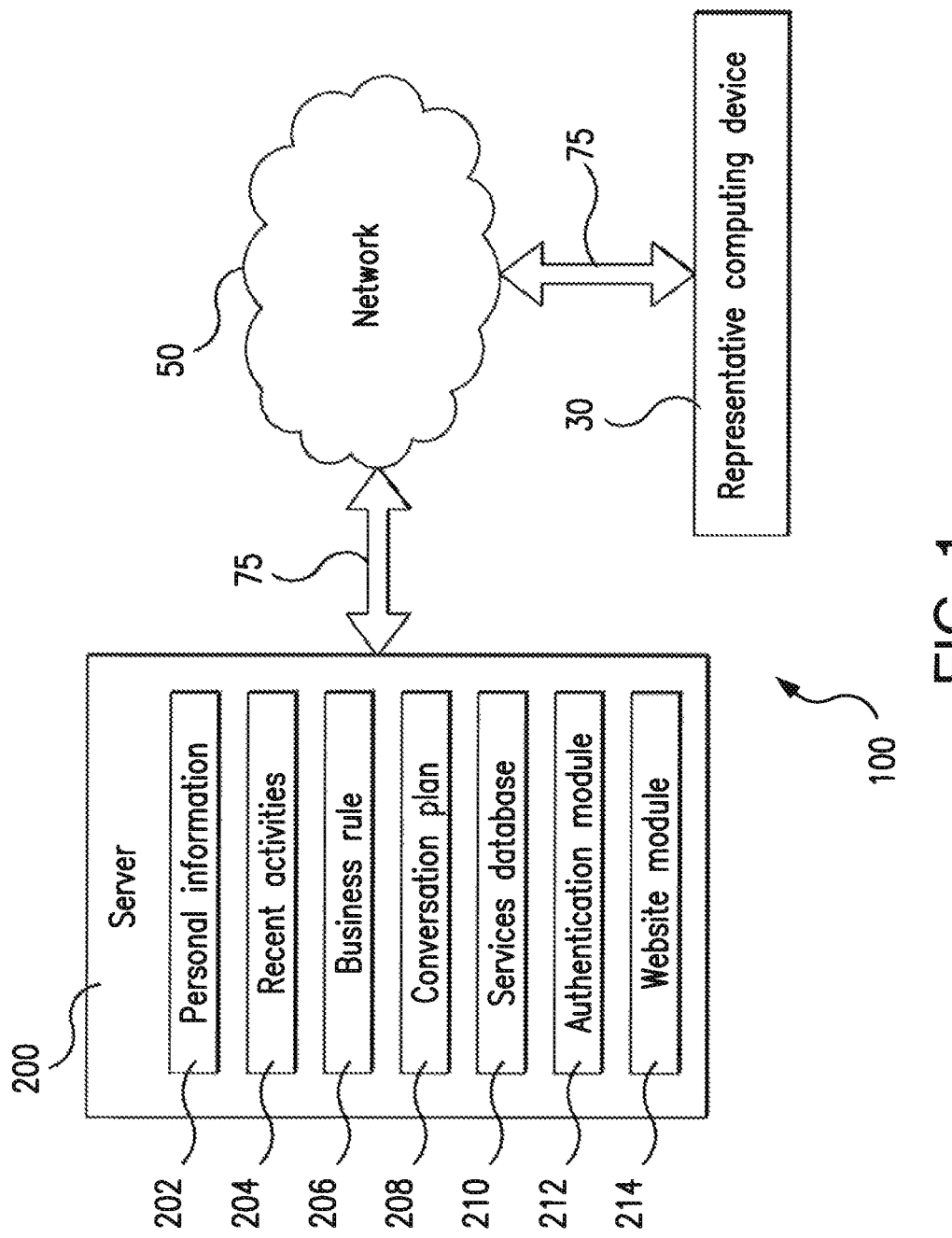
FIG. 1 is an exemplary system for streamlining customer interactions.

The below illustrated embodiments are directed to improving customer interactions based on recommendations presented graphically to the customer service representative for discussion with the customer. Preferably, the graphical recommendation are links that may be easily selected by the customer service representative to generate quotes for additional goods and services.

It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art.

By way of example, the following description relates to a company that provides a broad array of financial services such as insurance, banking, health insurance, tax advice, investments, automobile buying and financing, retirement planning, consumer shopping, real estate and the like. As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, the term "insurance policy" may encompass a warranty or other contract for the repair, service, or maintenance of insured property. As used herein, "insured property" means a dwelling, other buildings or structures, personal property, or business property, as well as the premises on which these are located, some or all which may be covered by an insurance policy.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the certain embodiments described herein. Thus the certain embodiments are not to be understood to be limited by what has been particularly shown and described, except as indicated by the appended claims.

Referring to FIG. 1, a hardware diagram depicting a system 100 in which the processes described herein can be executed is provided for exemplary purposes. In one embodiment, system 100 includes a server 200 communicating with a representative computing device 90 across a network 50 with communication channels 75. The server 200 stores personal information 202 about customers, recent activities data 204 related to the customers, business rules 206 to be applied as described herein, conversation plans 208 that are generated, a services database 210, which includes information about various services a company may offer, an authentication module 212 that performs customer authentication, and a Web site module 214.

For exemplary purposes only, personal information 202 about customers may include the customer's legal name, what name they preferred to be called by, names of their family members (including former family members such as ex-spouses), ages for the customer and their family, how the customer is eligible for coverage (if applicable). The personal information 202 includes information necessary to perform authentication of the customer as described herein. The authentication information may include one or more voice samples, caller identification numbers, hardware-specific data related to one or more mobile devices associated with the customer, media access control (MAC) address, and the like. The authentication module 212 includes the logic and processing capability necessary to accomplish the authentication of the customer.

Recent activities data 204 by the customer may include the customer enrolling in a service that the company offers (e.g., mortgage, automobile loan, auto/home/life insurance, banking, and credit card), changing the settings of a service already enrolled in (e.g., raising the deductible and lowering the premium of an auto insurance policy), calling the company to ask a question and/or discuss a topic, researching information on the company's website, and/or researching information on the internet and later visiting the company's website (e.g., wherein the company's servers may glean past Internet activities based on "cookies"). The recent activities data 204 may also include information related to current interactions between the customer and the customer service representative, data entered by the customer service representative, data gleaned from the customer's interaction during the current Web session, and the like. As can be seen, the recent activities data 204 is updated in real or near-real time.

Business rules 206 may include associations, correlations and/or causations between (1) information and/or past activities and (2) future activities. For example, a business rule may reflect the relationship between (1) a child attaining the age of 15 and (2) adding another member to an auto insurance policy. In another example, a business rule may associate (1) browsing the company's website searching for life insurance information and (2) the subsequent phone call to the company being a request to (2a) enroll in a life insurance policy, or (2b) change the settings of an existing life insurance policy. In yet another example, a business rule may associate (1) a customer attaining retirement age and (2) the customer lowering their life insurance premium to a lower amount.

In one embodiment, a conversation plan 208 may include a series of topics about which the company's representative will suggest discussing with the customer. For example, if the customer is about to turn 65 years old and has a child about to turn 15 years old, the conversation plan may include the representative first suggesting to talk about adding the child to an auto insurance policy, and subsequently discussing if the customer wants to amend their life insurance policy. In yet another example, a conversation plan may include asking about each service the customer is enrolled in with reference being made to the most recent event associated with each service (e.g., the first topic may be asking if the customer wants to amend their recently added home insurance policy, and the second topic may be asking the customer about the additional member she added to her auto insurance policy a year ago).

The customer service representative is presented with Web links to the recommend Web path aligned with the selected conversation plan. The recommendation is a Web link that the MSR clicks to open. Once open, the customer service representative can immediately generate the details of a recommendation such as a life insurance policy quote for the customer. It is preferably that if the customer's information has already been entered, then the customer information is auto-populated. Examples of such linking recommendations are that the customer should get life insurance, renter's insurance, a credit card sponsored by the company or otherwise, open investment accounts and the like. Such information is generally stored in the services database 210.

The services database 210 also includes information related to the customer's enrollment in any services that are offered by the company. Such information may include the details of the customer's policies, the details of previous settings to current policies, and the details of the settings to previous policies the customer has enrolled in. For example, if a company offers credit card services, mortgage services, banking services, automobile loan services, investment services, insurance services and housing services, the services database may include information related to their customers' involvement with those services.

The authentication module 212 includes all the necessary programming and information to perform enhanced authentication. The enhanced authentication module 212 may include voice or other biometric files related to each customer along with software routines for determining captured information matches the information on file.

The Web site module 214 is capable of creating Web pages and sharing the Web pages with multiple users over the network 50. The Web site module 214 can modify and update the Web pages based on interaction with customers and customer service representatives. The Web site module 214 can create private portions of the shared Web pages so that a customer and a customer service representative view the same Web page while additional portions may be private for viewing by only one party or the other. The Web site module 214 creates a rich environment for the customer and the customer service representative. One way of layering the information is to provide selectable links within the Web pages to other goods and services with the customer information auto-populated.

Figure 2:
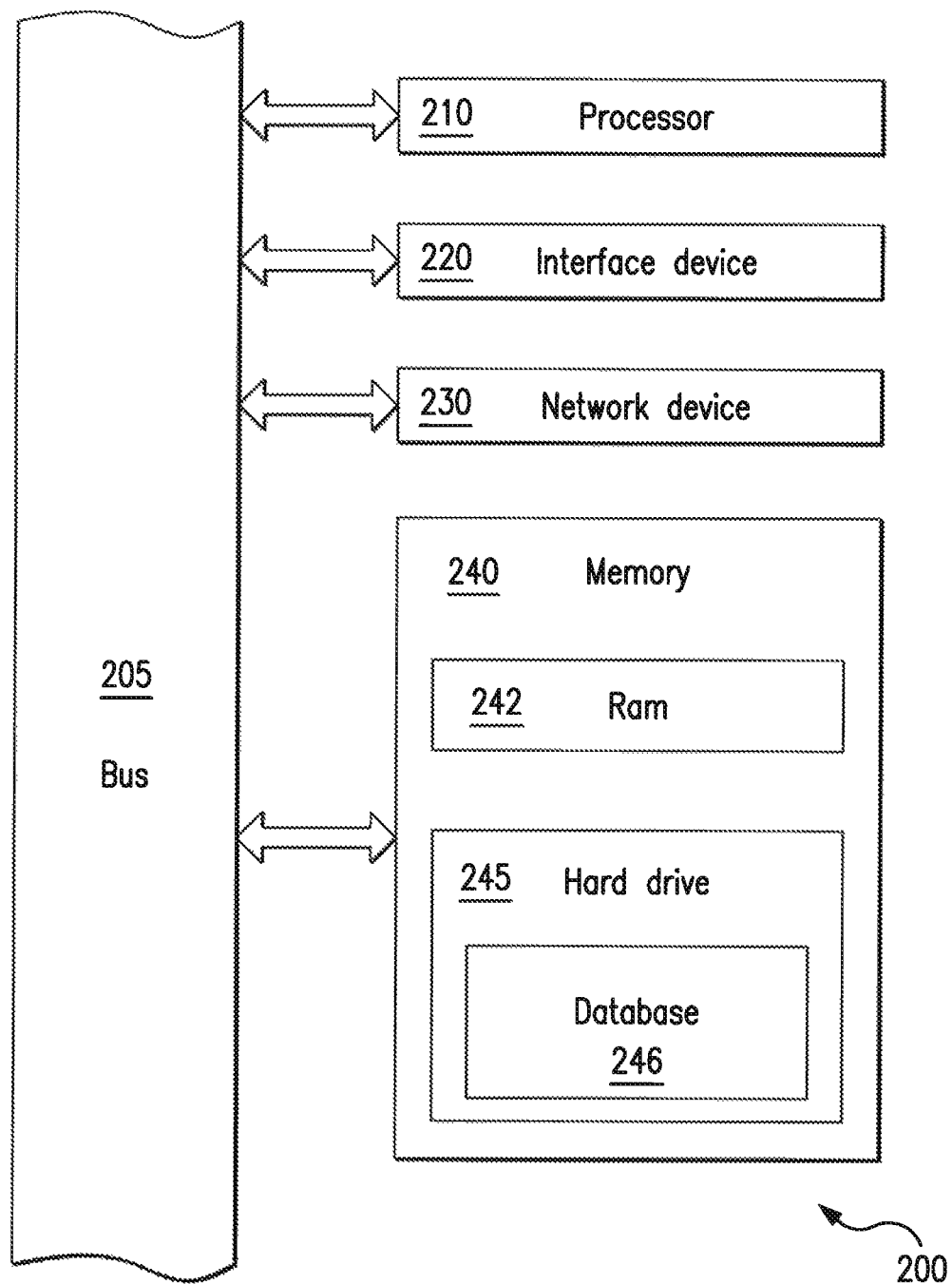
FIG. 2 is an illustration of an embodiment of a computing device.

Turning now to FIG. 2, illustrated therein is an exemplary embodiment of computing device 200 for use in the system 100. Such a computing device 200 is exemplary of how a server 200 and even how a representative computing device 90 may be configured. The following discussion is principally with respect to the computing device 200 when functioning as the server 200. The server 200 preferably includes bus 205, over which intra-device communications travel. A processor 210, interface device 220, network device 230, and memory 240 all communication across the bus 205. The server 200 also preferably includes RAM 242 and hard drive 245 for storage. The computing device 200 include a display system, such as a monitor (not shown), particularly when used as a representative computing device 90.

The term "module"/"engine" is used herein to denote a functional operation that may be embodied either as a stand-alone component or as an integrated configuration of a plurality of subordinate components. Thus, "modules"/"engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

Memory 240 is a computer-readable medium encoded with a computer program. Memory 240 stores data and instructions that are readable and executable by processor 310 for controlling the operation of processor 210. Memory 240 may be implemented in random access memory 242 (RAM), a non-transitory computer readable medium, volatile or non-volatile memory, solid state storage devices, magnetic devices, hard drive 245, database 246, a read only memory (ROM), or a combination thereof.

Processor 210 is an electronic device configured of logic circuitry that responds to and executes instructions. Processor 210 outputs results of an execution of the methods described herein. Alternatively, processor 210 could direct the output to a remote device (not shown) via network 50. The various components such as the processor 210 and memory 240 of the computing devices 200 can function as a server to accomplish the more functional databases and modules 202-214 described above as would be appreciated by those of ordinary skill in the art.

It is to be further appreciated that computer networks, upon which the embodiments described herein my interact and/or function, can include a local area network (LAN) and a wide area network (WAN), other networks such as a personal area network (PAN), or any combination thereof. Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. It is to be appreciated that the illustrated network connections of FIG. 1 are exemplary and other means of establishing a communications link between multiple computers may be used.

It should be understood that computing devices 200 each generally include at least one processor, at least one interface, and at least one memory device coupled via buses. Computing devices 200 may be capable of being coupled together, coupled to peripheral devices, and input/output devices. Computing devices 200 are represented in the drawings as standalone devices, but are not limited to such. Each can be coupled to other devices in a distributed processing environment.

Figure 3:
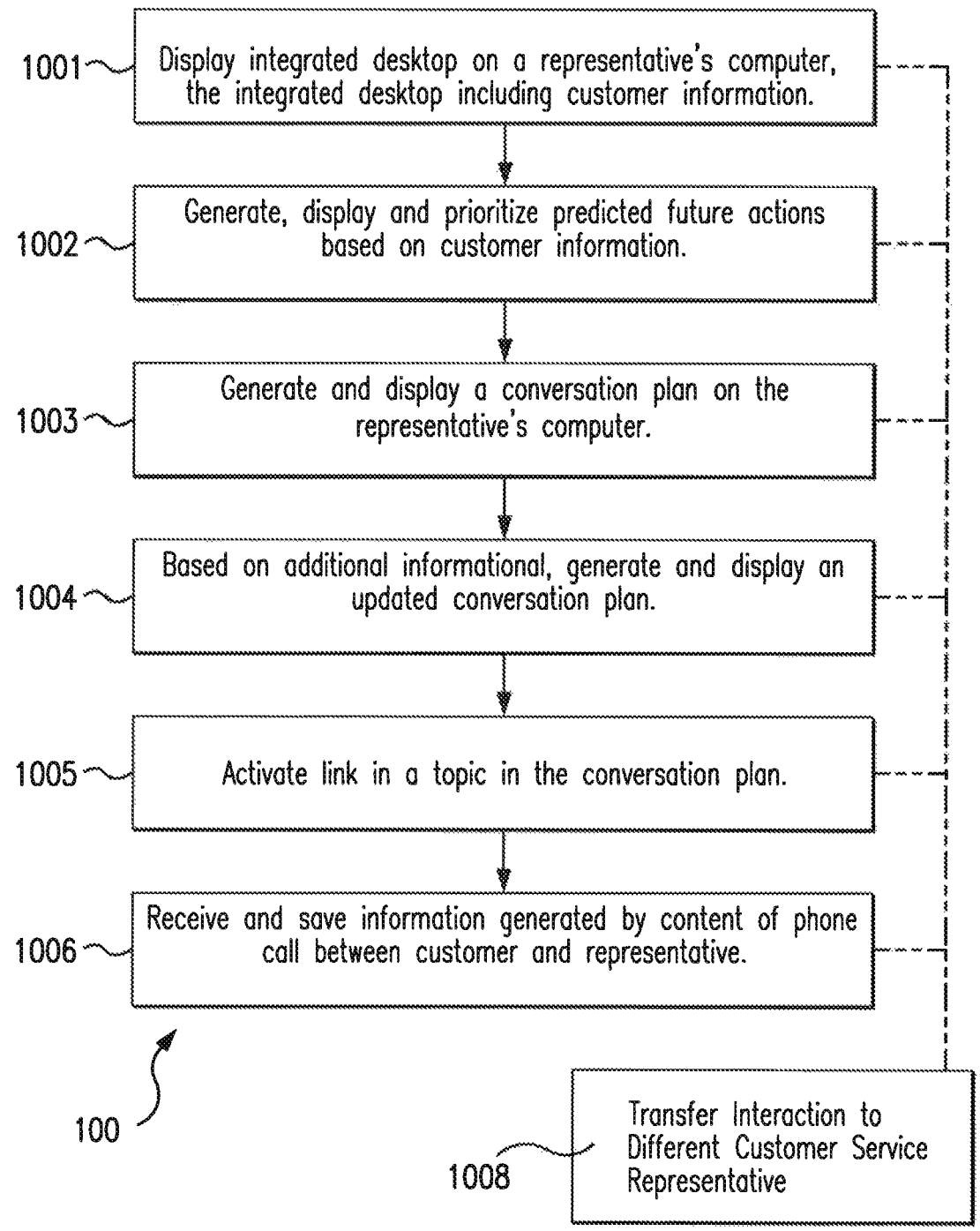
FIG. 3 is a flow chart illustrating an exemplary method of utilizing the exemplary embodiment of FIG. 1.

Turning to FIG. 3, illustrated therein is an exemplary process 1000 of utilizing system 100. Starting at step 1001, interaction with a customer begins and an integrated desktop is displayed on the workstation computer 90 of a representative of a company. The interaction may be an online chat, incoming call by the customer, or the customer service representative being prompted to call the customer and the like. The integrated desktop is a software application or module running in the system 100 that presents information on the workstation computer 90. The integrated desktop creates and presents a plurality of screens related to the customer for review by the customer service representative.

The integrated desktop includes customer information about customers, both current, past and potential. When presenting information to the customer service representative, a customer dashboard is created. The customer dashboard can change from screen to screen but continually provides information related to the customer to facilitate the customer service representative establishing rapport with the customer. Establishing a good interaction with the customer facilitates the customer will tell their story (e.g., share information). As a result, the customer service representative gains an understanding of the customer's needs, both recognized and unrecognized, to provide excellent service and advantageous upselling.

Upon receiving the call from the customer, the system 100 utilizes the authentication module 212 to verify the customer's identity and prevent fraud. The customer is initially asked typical information such as their name and/or customer number. Based on the initial information, the data relevant to the customer can be found in the personal information 202 and other locations.

Figure 4:
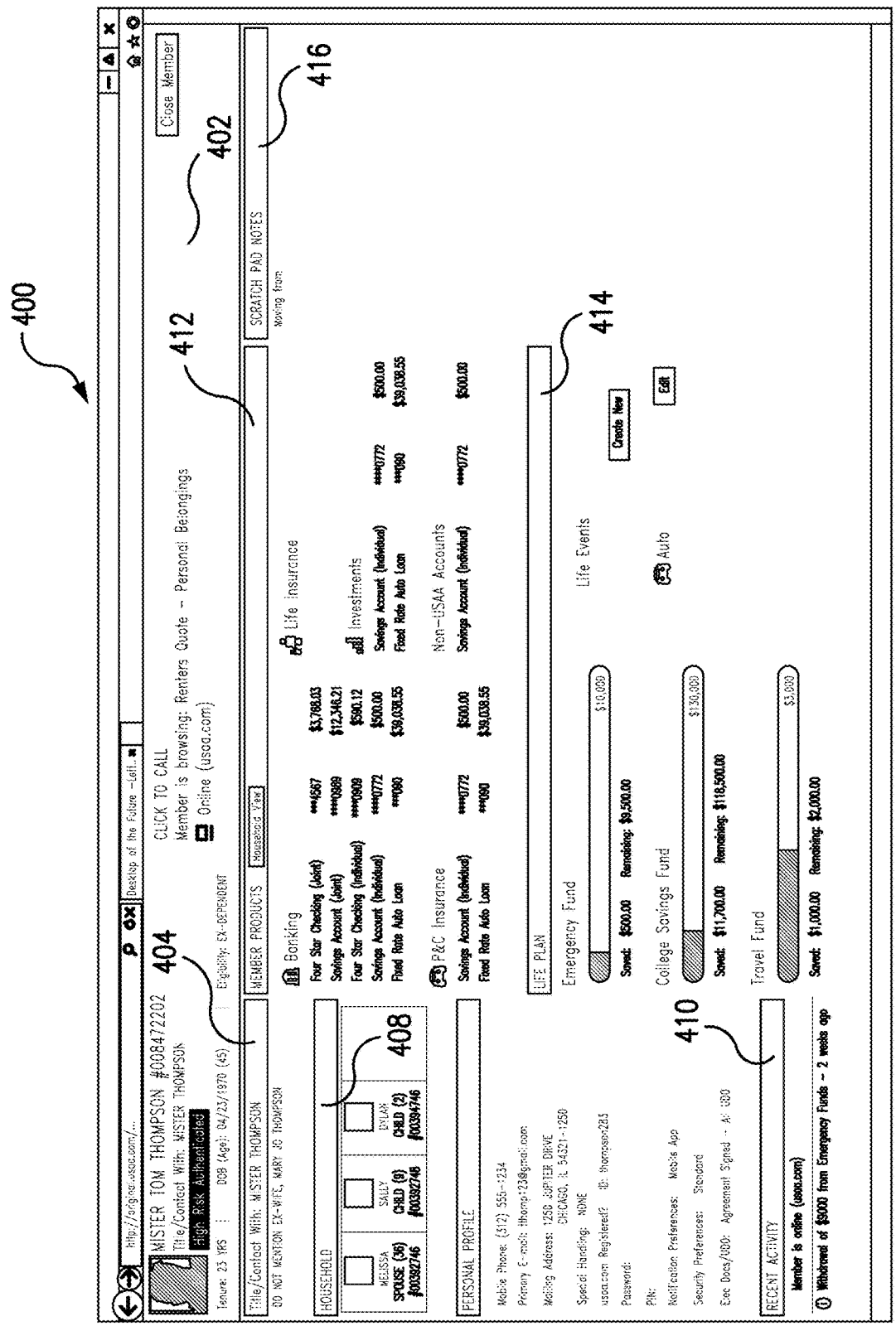
FIG. 4 is an exemplary screen shot for review by and interaction with a customer service representative in accordance with the subject technology.

Once the initial customer information is acquired, whether it be by telephone or another method, the system 100 can present an initial screen shot 400 for review by the customer service representative as shown in FIG. 4. The screen shot 400 includes several components of the customer dashboard that can be used, modified, and re-used with other components not shown. One or more portions of the customer dashboard are likely to remain in view of the customer service representative through several screen changes. Upon review of the screen shot 400, the customer service representative begins to get an excellent understanding and feel for the customer and his situation.

The screen shot 400 includes a header portion 402 for a customer named Tom Thompson. The header portion 402 presents basic information right at the top of the screen shot 400 for a clean and simple view of the customer. The header portion 402 includes name, title and authentication status (i.e., high risk authenticated). In this example, the header portion 402 also includes that Mr. Thompson has been a customer of the company for 23 years, his date of birth, and age. As this company requires certain criteria to be met in order to utilize their goods and services, the eligibility criteria of Mr. Thompson is also noted, namely eligibility by, at one time, being the dependent child of an eligible person.

The header portion 402 also includes a current status of the customer, namely that Mr. Thompson is on the company's Web site usaa.com. More detailed information regarding the status of browsing a renters quote is also provided. In the event contact has not yet been established by telephone, the customer service representative can click within the header portion 402 to call the customer. Or, if interaction is terminated, the customer service representative can click within the header portion 402 to close the screen shot 400 and move on to the next interaction.

The screen shot 400 has a notices portion 404 for presenting salient information like topics to avoid (e.g., former spouse) as well as the ability to create additional entries in this section for future reference. A personal profile portion 406 includes contact and system information (e.g., notification and security preferences) along with the ability to perform typical access related tasks (e.g., password and PIN changes) for Mr. Thompson. A household portion 408 includes pictoral identification of the household members along with an ability to update the household. The screen shot 400 also includes a recent activity portion 410 that allows the customer service representative to scroll through the activity of Mr. Thompson in reverse chronological order.

As can be seen, the portions 402, 404, 406, 408, 410 allow the customer service representative to establish baseline knowledge about the customer quickly and easily. In the event that the interaction is by telephone, normal and customary greeting is accomplished to begin building rapport between the customer and customer service representative. A customer products portion 412 provides a view of customer accounts including any accounts related to the household. A life plan portion 414 graphically illustrates various goals identified for the customer. By pairing the customer products portion 412 with the life plan portion 414, the customer service representative has a broad overview of Mr. Thompson's financial status and outlook. As a result, the customer service representative can review the customer's life situation to identify enhanced product and service offerings or new offerings (i.e., upselling) based on recognized needs even if the customer does not recognize the need.

Still referring to FIG. 4, the screen shot 400 includes a scratchpad notes portion 416. In the scratchpad notes portion 416, the customer service representative can prepare additional notes in paragraph form for review in subsequent interactions.

As can be seen, the screen shot 400 provides conversational, status, product and other information related to the customer, Mr. Thompson. By reviewing the information of the screen shot 400, the customer service representative is better able to have a productive, efficient and smooth dialogue with the customer. It is envisioned that the customer service representative gleans available cues from the screen shot 400 to inform her expectations for the upcoming interaction with the customer. As a result, rapport is maintained and improved.

Further, the same screen shot 400 can be presented to subsequent customer service representatives who may be called upon to interact with the customer due to having a specialty or higher experience level. The subsequent customer service representative can again quickly and easily review the personal information about the customer, the customer's family's information, the customer's age, recent activities the customer has engaged in (e.g., withdrawal of $9,000 from an emergency fund, a fixed rate loan of $40,000), status of the phone call (e.g., if the customer has been transferred and how many times, how long the customer has been on hold, how long the call has lasted), an indication of the customer's preferred nickname (e.g., "Tommy" instead of "Thomas") and the like to establish rapport. Additionally, the screen shot 400 may include a button to accomplish the transfer of the call within the company.

While screenshot 400 is being presented to the customer service representative, the system 100 can perform enhanced authentication using the authentication module 212 without disturbing the conversation flow. In one embodiment, the personal information 102 includes one or more voice samples captured during previous verified interaction with the customer. The system 100 captures additional live voice samples for comparison. If the speaker matches, enhanced authentication is complete and the system 100 proceeds. It is envisioned that the recorded and live voice samples are captured without interruption in the conversation however it is not required.

In an alternative embodiment, the system 100 uses caller identification numbers acquired from the current call for comparison against a caller identification number stored in the personal information 202. If the authentication module 212 determines that the caller identification numbers match, then enhanced authentication is verified without interrupting the conversation. The caller identification number authentication may be instead of or in addition to the other enhanced authentication techniques disclosed herein.

In another embodiment, the authentication module 212 captures hardware-specific data related to one or more mobile devices associated with the customer. The hardware-specific data may include a device serial number, network account information, the version of software running on a mobile phone, type of mobile phone, or other information associated with land lines and the like. By again finding matching information, the system 100 is able to perform enhanced authentication without interrupting the conversation. The hardware-specific authentication may be instead of or in addition to the other enhanced authentication techniques disclosed herein.

Still another embodiment of enhanced authentication utilizes media access control (MAC) address. Again, the system 100 captures the MAC address during the conversation and compares the MAC address to a MAC address stored in the personal information 202 without interrupting the conversation. When the authentication module 212 determines a match, enhanced authentication is verified. The MAC address authentication may be instead of or in addition to the other enhanced authentication techniques disclosed herein.

It is envisioned that the original personal information 202 is also populated without interrupting initial conversations. Additionally, the various enhanced authentication techniques may be prioritized so that the order is set. Upon failure of the first enhanced authentication attempt, a predetermined number of repeat attempts may be tried. However, rather than finalizing the process upon a failed enhanced authentication attempt, the system 100 proceeds to attempt enhanced authentication with the next parameter and so on until authentication is successful or all of the parameters have been exhausted.

Figure 5A:
FIG. 5A is another exemplary screen shot having a split screen for review by and interaction with a customer service representative with a portion that is also available to the customer in accordance with the subject technology.

As the interaction with the customer progresses, the system 100 presents additional screenshots such as shown in FIG. 5A. Although the Web pages 500, 600 of the FIG. 5 screenshot may be presented separately, the customer service representative may review them on a split screen by request or certain events may cause the split screen to occur automatically. For example, when the customer service representative assumes control of screen 600 for review with the customer, the split screen occurs automatically.

The FIG. 5A screen shot includes a first Web page 600 that is accessible to the customer service representative and the customer at the same time whereas a second Web page 500 is only accessible to the customer service representative or vice versa. The customer service representative can see the interaction of the customer with first Web page 600 and take control of the Web page 600. The customer service representative can also prepare windows and applications in the second Web page 500 to be dragged and dropped into the first Web page 600 for review by the customer. Additionally, the customer service representative may create and modify content directly on the Web page 600.

The content of the first Web page 600 is selected by the customer and the customer service representative due to the common interaction. However, the content and interaction of the second Web page 500 is completely under the control of the customer service representative. Preferably, only the customer service representative can see the second Web page 500. The customer service representative can prepare quotes, start applications, create display windows and the like on the private portion of the FIG. 5A screenshot (e.g., Web page 500), then simply drag and drop the desired portion onto the first Web page 600 for simultaneous review by the customer. In one embodiment, the customer service representative generates a full detail price quote for an insurance product, then drops the price quote into the shared area for review by the customer. As a result of the enhanced guidance and interaction with the customer service representative, telephonic interaction between the customer and customer service representative is enhanced. Frustration on the part of the customer can be avoided and overcome.

In order to provide more information regarding screenshot 500, FIGS. 5B-I are provided to illustrate subparts of screenshots 500, 600. The details of FIGS. 5A-I are self-explanatory and thus, not described in great detail herein.

Figure 5B:
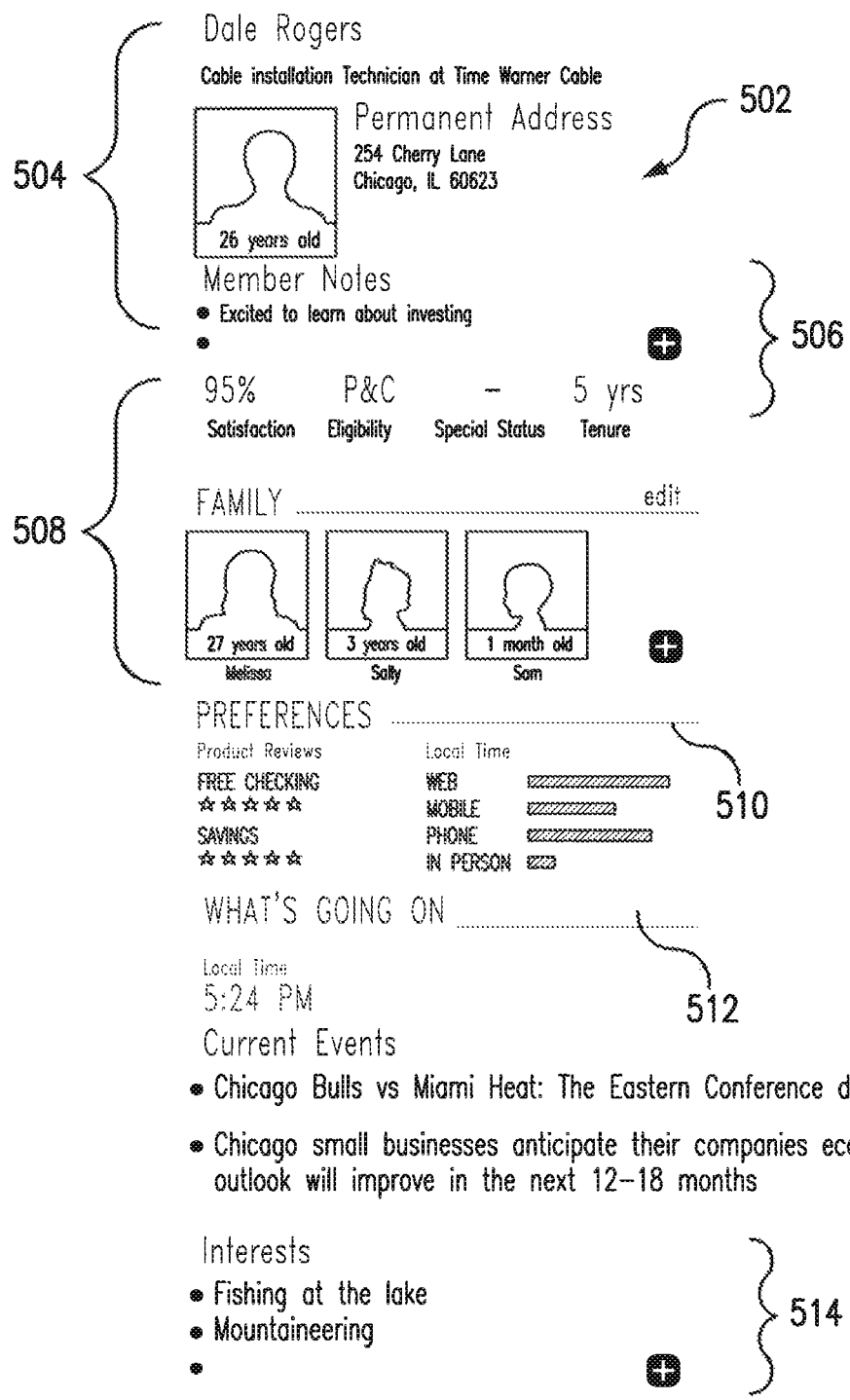

Referring now to FIG. 5B, the member dashboard information area 502 to establish and improve rapport with the customer has been modified and sized to still fit on a left side of the screen shot 500. The dashboard area 502 has a header area 504 including the customer's name, job, photo if available, age, and address along with the ability to edit such information. A notes area 506 shows previous notes and can receive new notes. A household area 508 includes family related details, survey results in the form of a satisfaction score, eligibility information, special status, and tenure as a customer.

A preferences area 510 of the dashboard area 502 illustrates the products reviewed by the customer, the rating for same, and a link to further see the details of the review. The preferences area 510 also includes charted channel information, when the customer has Web, mobile, phone, and in-person contact available. A "whats going on" area 512 allows the customer service representative to engage in small talk by presenting the local time and current events in the geographic area of the customer. Effective small talk is not only helpful to overcome small gaps in the conversation flow but fosters development of rapport. Similarly, the dashboard area 502 has an interests area 514 that presents known interests of the customer. Again, by knowing what the customer's interests are, the customer service representative is able to more effectively interact with the customer.

Referring again to FIG. 3, the system 100 may generate, prioritize and display future actions predicted by the customer's information and business rules (step 1002). The screen shots 500, 600 of FIG. 5A are examples of the information presented to the customer service representative. Once likely future actions are predicted, these actions can be further utilized by the conversation plan module 208 to create the linking recommendations as described below.

Referring now to FIGS. 5A-I, based upon the information gathered by the customer service representative, the integrated desktop program generates and displays additional information while prioritizing future actions (step 1002 of FIG. 3). The customer service representative typically reviews screenshots 400, 500, 600. Initially, during the interaction with the customer, typically a call, the customer service representative reinforces the customers connection to the company by being familiar and dexterous with the details related to the customer. As the customer service representative navigates the various screenshots of the Web site and interacts with the customer, the customer service representative begins to understand the larger context of the customer while encouraging the customer to share their story and enter salient details into the system 100. This process helps the system 100 and the customer service representative to identify the customer's intent and needs. As a result, the comfort level of the customer with the customer service representative increases. This enhanced customer comfort truly makes it easier for the customer service representative to up-sell.

Figure 5C:
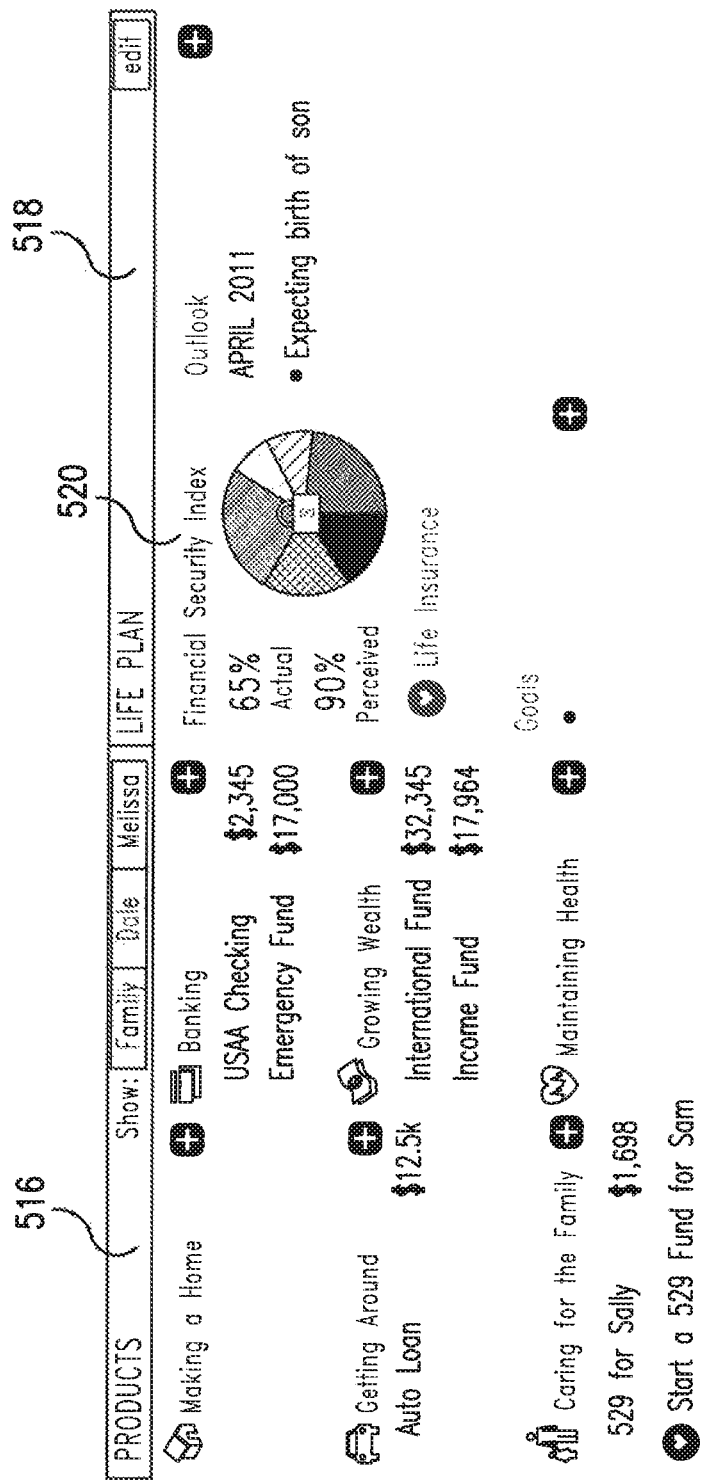

Referring to FIG. 5C, the additional information for review by the customer service representative is shown in a products area 516 and a life plan area 518. The products area 516 provide a graphical summary of relevant products and services already provided to the client such as a home loan, car loan, mutual fund or other savings plan (e.g., 529 college fund), bank account information, investment information, and health information. The life plan area 518 creates a figure of merit 520 for financial security based on the data related to the customer and possibly other factors. The system 100 generates an "actual" reading of the index 520 based on the customer information. The customer service representative also inputs sentiment from the customer to help generate a "perceived" reading of the index 520. Additionally, goals and outlook of the customer, as identified by the customer service representative, are included in the life plan area 518.

Referring to FIG. 5D, an understand area 522 of screen shot 500 is illustrated. The understand area 522 helps the customer service representative enter, track and document interaction with the customer for use during the interaction and subsequent interactions. The understand area 522 includes a reason for the call and associated time, mood and interest indication. Current aspirations are also updated along with concerns and recent life events that the customer may have. Based upon the interaction and review of the information, the customer service representative can enter details in a call notes section. Similarly, an interaction synthesis and interaction history are included in understand area 522.

As can be seen, the system 100 presents a plurality of screens to the customer service representative at their workstation 90 so that the customer service representative can give and take information with the system 90 while interacting with the customer to upsell and otherwise assist the customer to accomplish their goals. The customer is also able to review a plurality of Web pages that reflect the customer service representative activity as well as their own selections and/or entered data and the like. Once the customer becomes confident that the customer service representative is working towards the customer's goals, confidence in the company and rapport with the customer service representative occurs.

Referring again to FIG. 3, at step 1003, the system 100 may also generate and, prioritize and display a conversation plan area 602 (see FIGS. 5E-H), which is part of screen shot 600 of FIG. 5A. The conversation plan may include one or more topics. Each topic may include, for exemplary purposes only, a question for the representative to ask the customer, a topic to be raised, and/or a recent change to the customer's services and/or situation.

Figure 5E:
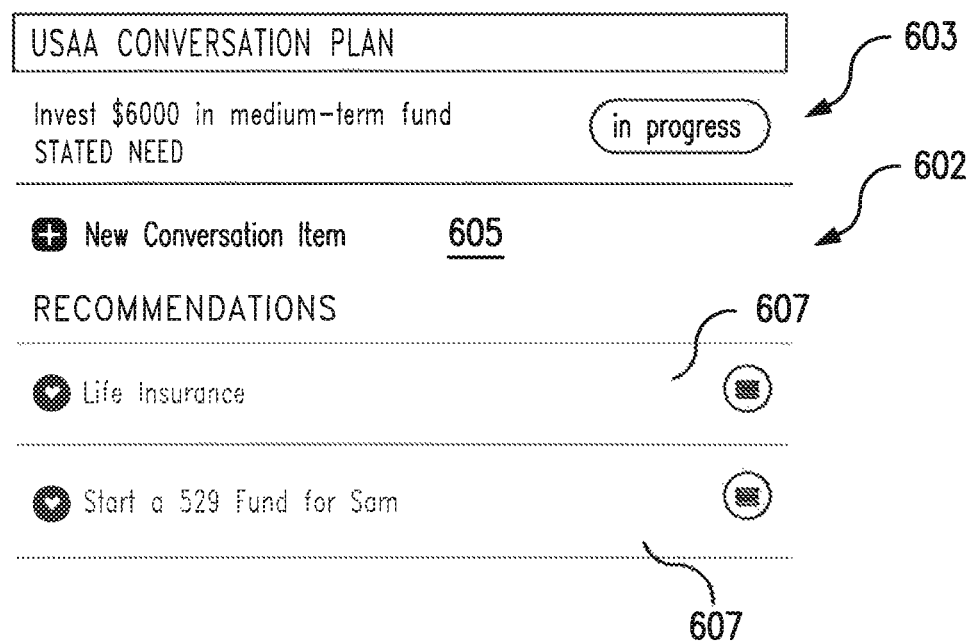

Preferably, each topic displayed in the conversation plan area 602 on the representative's computer may include one or more links, each link providing the ability for the representative to quickly access different information and/or functionality. A typical link is a graphical image or text, usually underlined and in special color, to alert the customer service representative. The customer service representative can select the link to open additional Web pages to accomplish various tasks or access different information and the like. The system 100 cross-populates the Web pages accessed by the link on-the-fly so the customer service representative does not have to repeatedly enter the same information. Referring now to FIG. 5E, an exemplary initial conversation plan area 602 is illustrated. This conversation plan represents the beginning of an in-progress interaction between a customer service representative and a customer. The customer is being helped with a $6,000 investment indicated in area 603. The system 100 reviews the personal information database 202 and recent activities database 204 to determine, in this example, that a new baby had just arrived in the family. By applying rules from the business rule database 206, new conversation items area 605 illustrates several expandable topics 607.

The new conversation items 607 relate to life insurance and starting a 529 college saving fund for the new baby, Sam. The system 100 generates these suggestions (e.g., the conversation plan) for storage in the conversation plan module 208. The conversation plan is based on the recent activity, stored in the recent activity database 204, and application of business rules stored in the business rules database 206 and any other pertinent data. The conversation plan module 208 pulls together the activity data and applies the business rules in combination with acquiring additional information about the relevant goods and services from the services database 210. As the conversation plan is developed, the system 100 uses the Web site module 214 to create Web pages for presentation to the customer service representative and the customer. It is envisioned that the Web pages will not only be linked together but often many Web pages will be overlayed or simply represented as links.

Figure 5F:
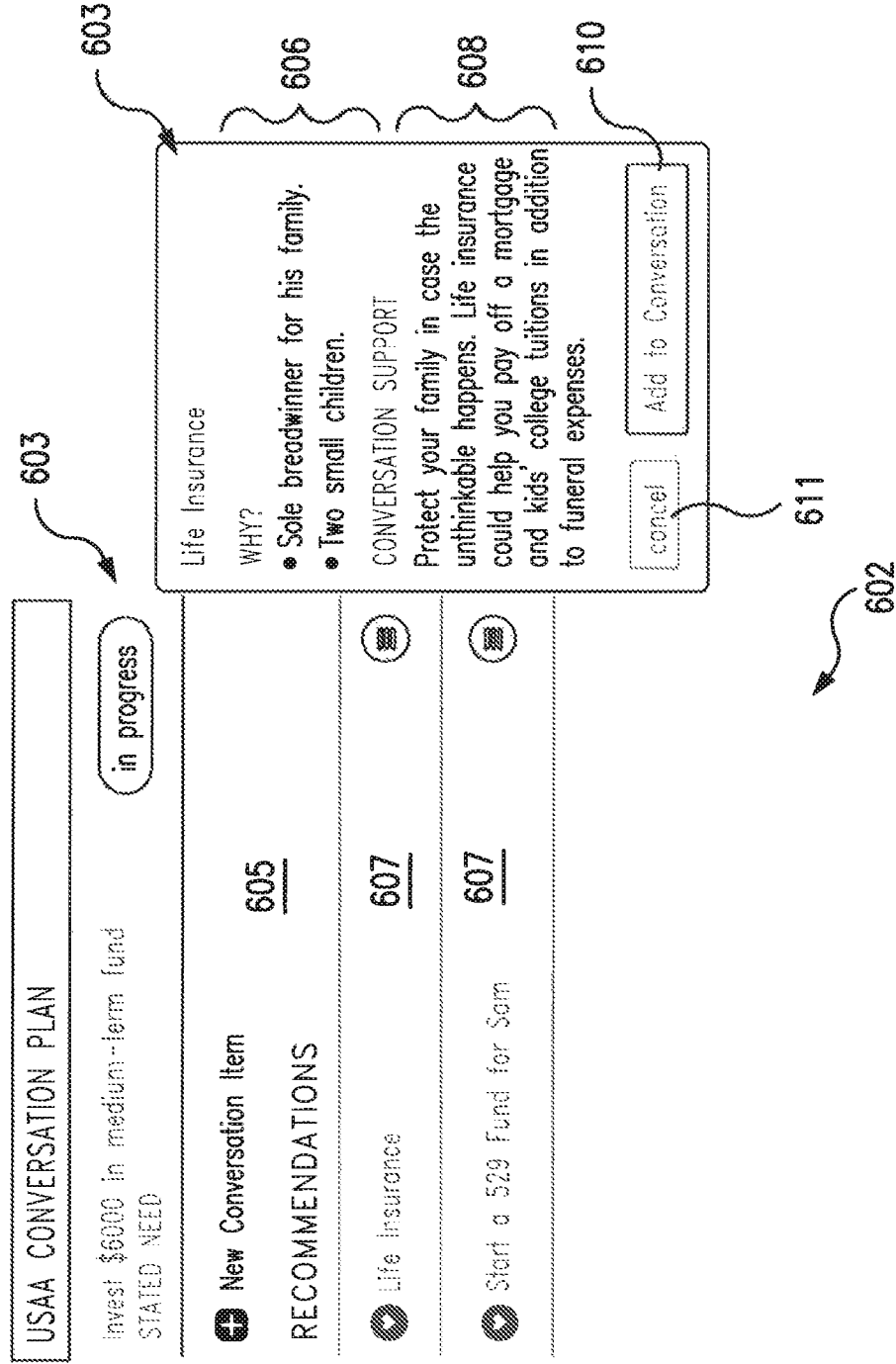

Referring now to FIG. 5F, the conversation plan area 602 with additional support area 604 is shown. As the customer service transitions into the recommended topics and indicates such, the system 100 provides additional suggestions and elements in the support area 604. In order for the support area 604 to be displayed, the customer service representative simply needs to hover the screen pointer over the desired item 607.

The support area 604 provides talking points 606 and supporting dialog 608 for the customer interaction related to the correspond item 607, in this case "life insurance." The customer service representative can also easily enter these points into the record of the interaction by selecting an "Add to Conversation" button 610 and/or close the support area 604 by selecting a "cancel" area 611. Of course, this technology is equally applicable to "online chat", instant messaging, video conferencing and other forms of interaction.

Figure 5G:
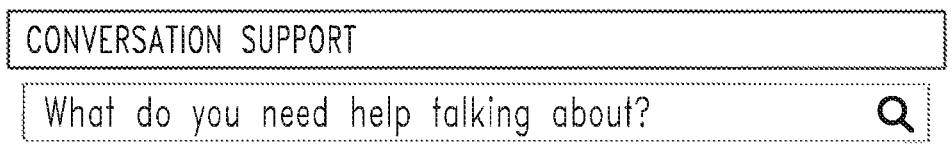

As the interaction proceeds, the system 100 provides additional information as the customer service representative enters additional information about the interaction by updating the conversation plan (step 1004 of FIG. 3). For example, a conversation support area 614 as shown in FIG. 5G is presented to the customer service representative to assist with the discussions related to life insurance and 529 college savings accounts. The conversation support area 614 hopefully provides talking points that allow the customer to recognize that the customer service representative is not only trying to assist with accomplishing the customer's goals, but also to identify what those goals may be. Such exercises build rapport and confidence with the customer.

Figure 5H:
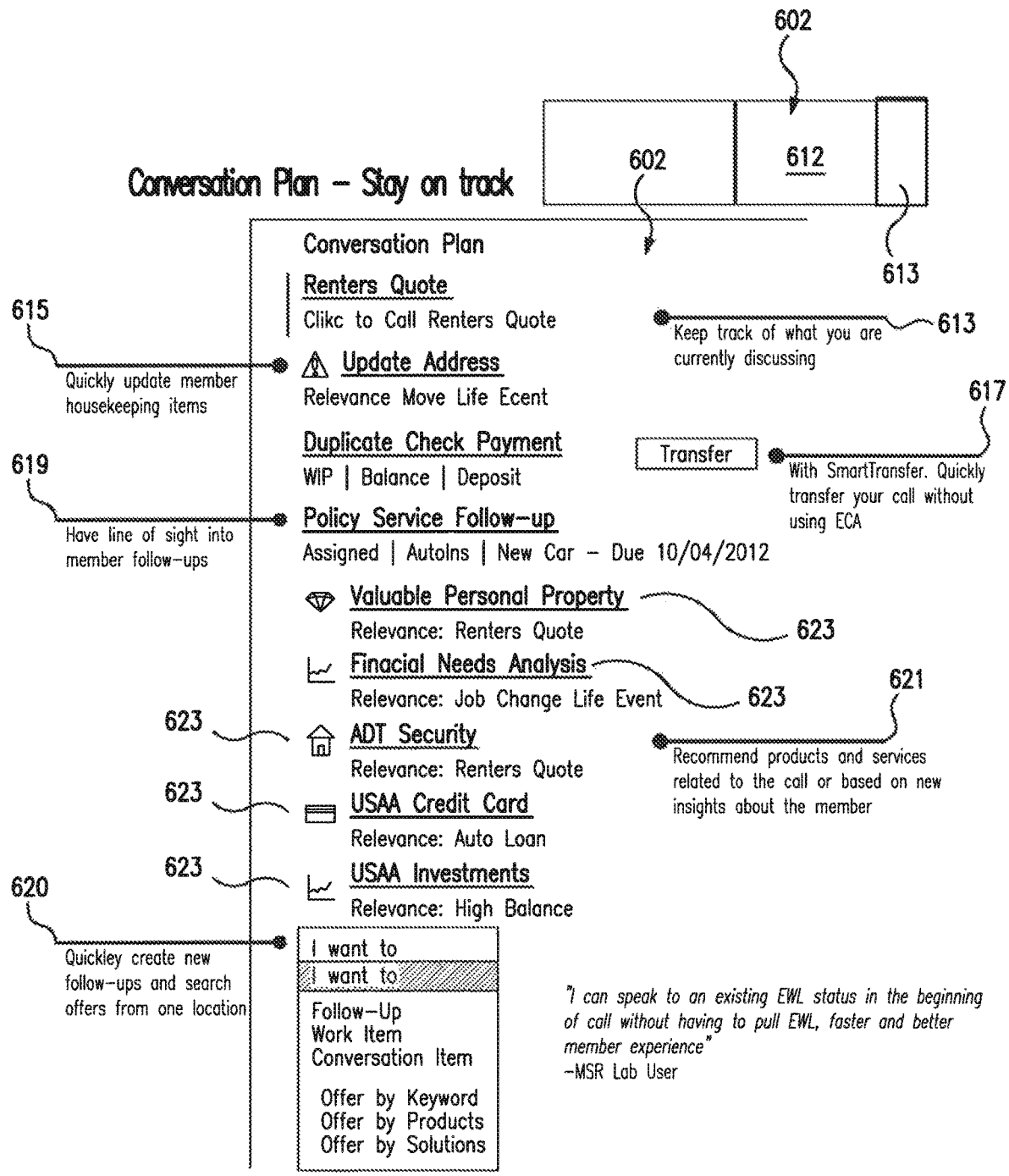

Referring to FIG. 5H, the conversation plan area 602 is again shown but with links that have been activated, such as by point-and-click action, in accordance with step 1005 of FIG. 3. FIG. 5H represents a conversation plan for a different individual than above, say a typical young adult that the company would like to begin a life-long relationship with. As such, the conversation plan would look much different from the parent with three children above. For example, this conversation plan may be to discuss renters insurance as shown by area 613. The proposed renters insurance quote is preferably shown in an adjacent area such as 612 of the screen shot 602.

As would be appreciated, the conversation plan area 602, via the link, may allow the customer service representative to quickly and automatically open the related activity and/or potential customer's policies while still allowing the customer service representative to actively engage in the current conversation. Housekeeping tasks such as updating the customer's address can be attended to in area 615. If transfer to a different customer service representative is helpful, a "transfer" button 617 is selectable. In this example, the "transfer" button 617 is shown because a duplicate check payment occurred, which may require the expertise of an account services specialist.

In order to effectively transfer, the customer service representative may need to docket follow-up with the customer using follow-up area 619. Existing follow-up items are shown in the follow-up area 619 but to create a new follow-up item, the customer service representative uses a pull-down menu area 620. Pull-down menu area 620 provides a list of selectable options so that the customer service representative can quickly generate additional follow-up items. Additionally, the pull-down menu area 620 allows the customer service representative to search for offers to present to the customer. The offers may be searched by keyword, product or solution and the like.

Still referring to FIG. 5H, by applying the business rules and conducting the searching, the conversation plan is updated to include a variety of products and services to discuss with the customer service representative, which are shown in recommendations area 621. Still on the example of young adult renting topics, for discussion, include credit cards, investments, financial planning, etc. Each such possible recommendation is provided as a selectable link 623, whether it be in the form of special font text or a graphical icon.

As each link may be selected, the conversation plan area 602 remains while the information related to the selected link is shown in Options Explorer portion 612 of screen shot 600, an example of which is shown in FIG. 5I. In another embodiment, for example, if the topic is to ask if the customer would like to initiate life insurance, the link may allow the representative to quickly and automatically access the ability to generate and configure life insurance quotes. It is contemplated herein that the link may be a hyperlink (e.g., such as in Web browsers) that opens in the same "page", the link may be a hyperlink that opens a new "page", clicking the link may start a different program/application on the representative's computer, or any other functionally equivalent or similar computerized transition mechanisms as known in the art. Referring now to FIG. 5I, a detailed view of exemplary "investment option" is shown in Options Explorer portion 612. The Options Explorer portion 612 would be available to the customer service representative throughout the customer interaction. In the example of the father of three, the customer service representative is managing the $6,000 investment via the Options Explorer portion 612 of the screen shot 600 preferably after having selected a representative link. Even as more data is entered into the system 100 by the customer service representative and the screens 500,600 (step 1006 of FIG. 3), the Options Explorer portion 612 remains shown and is simply updated in real-time.

By discussing the customer's needs in view of their current life situation, the customer service representative guides the customer in a discussion of recommended solutions, options and opportunities. Because of the assistance of the integrated desktop program running on the system 100, the customer service representative helps the customer think through concerns and possible objections. By making the customer feel empowered to decide on the course of action, the customer is willing and likely to select solutions, products and services of the company that best address their needs and aspirations. The integrated desktop helps the customer service representative see a global view for the customer and respond when the customer requests assistance. By asking questions to make sure that the customer service representative truly understand the needs of the customer, a shared understanding of the requests and needs is accomplished. From this point, the customer and the customer service representative can engage in detailed tactical work, still within the integrated desktop, to bring decisions to fruition and tasks to completion.

In order to complete the designed plan, future action may be required. The customer service representative uses the integrated desktop to create the future plan in a tangible and actionable manner. The customer service representative passes along from the integrated desktop the relevant resources to support the customer in following their personal path to financial security and accomplishing the plan goals. Milestones, deadlines and follow up with the customer are all entered into the integrated desktop. After the interaction, the customer service representative follows up with the customer, upon prompting by the integrated desktop, via the channel of the customer's choice, to deliver tangible evidence of progress and provide support for taking the relevant next steps.

Figure 5J:
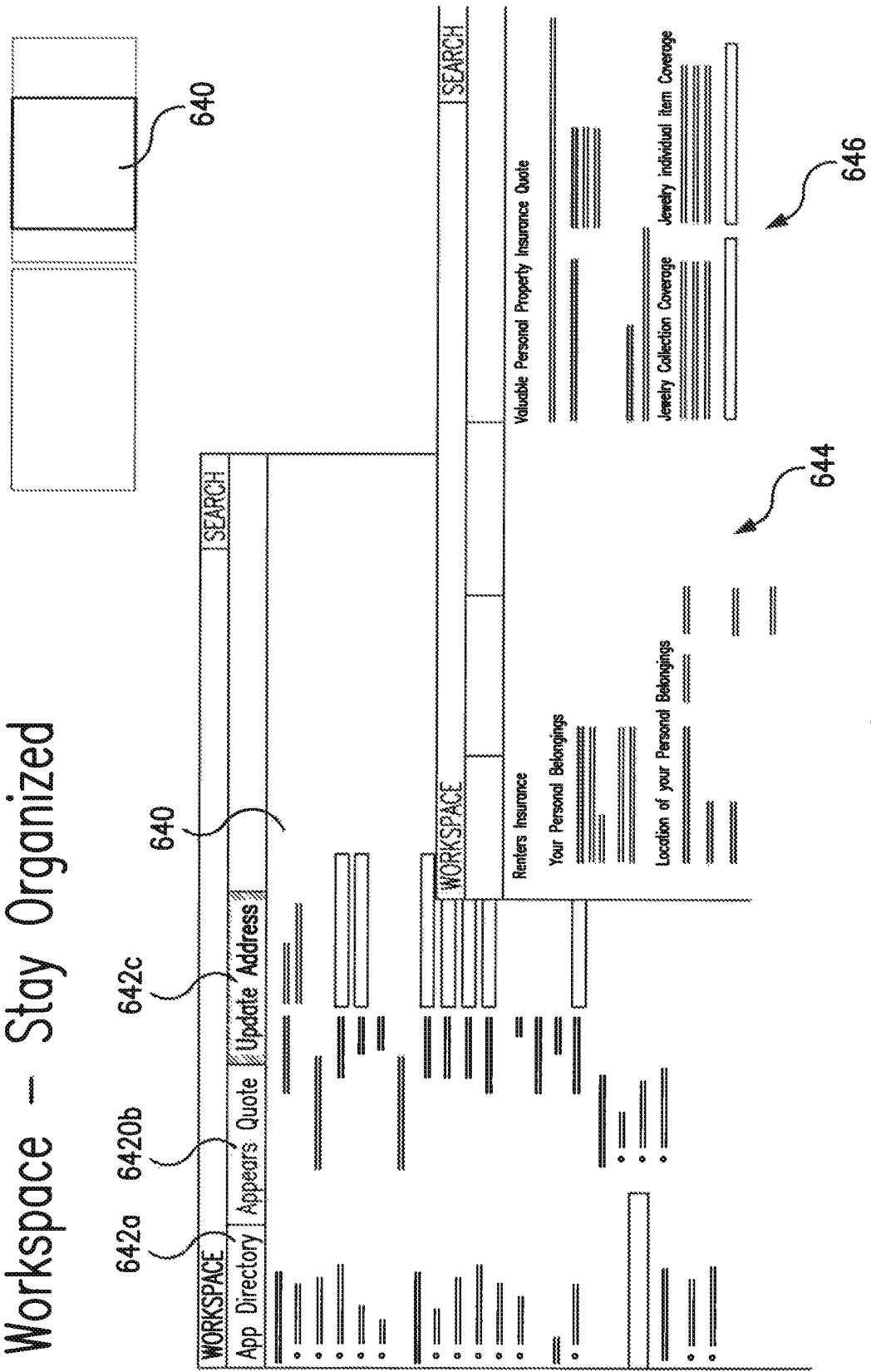
FIG. 5J is an exemplary screen shot having layered and linked Web pages for review by and interaction with a customer service representative in accordance with the subject technology.

Referring now to FIG. 5J, it illustrates an exemplary screen shot having layered and linked Web pages for review by and interaction with a customer service representative in accordance with the subject technology. By linking and layering the Web pages, the customer service representative has an organized view of the activity. The base view 640 is part of the screen shot 600 in the same location as Options Explorer portion 612. Indeed, the base view 640 could start out as the Options Explorer portion 612. However, in FIG. 5J, a different example is illustrated from that above.

In FIG. 5J, multiple windows are being accessed by the customer service representative, each window being represented and accessed by a tab 642*a-c* (information related to an application directory, a renters quote, and updating an address, respectively). The customer service representative can move between the three activities by selecting the desired tab 642*a-c*. Even within the presented base view 640, additional windows 644, 646 can be layered onto the base window 640. In the example shown, window 640 relates to updating the address information while window 644 relates to the renters quote and window 646 relates to personal property coverage. Each window 640, 644, 646 may include a plurality of tabs as desired by the customer service representative.

Referring again to FIG. 3, in one embodiment, and in some utilizations, based on information gathered and/or received during the phone call, the new conversation plan may be generated because the customer called to cancel their life insurance because money is currently limited. The resulting new conversation plan includes a topic that directs the representative to ask the customer if they would like to reconfigure their other policies (e.g., auto insurance, home insurance) to lower the premiums based on application of a business rule to determine this as appropriate action.

Again, information gathered during the phone call is saved to system 100 (step 1006) for inclusion and updating of all information and conversation plans for the respective customer. This information includes, for exemplary purposes only, any information communicated by the customer to the representative (e.g., I would like to increase my auto insurance coverage in a few months), any additional policies that the customer enrolled in (e.g., adding home insurance policy), changes to policies that the customer is enrolled in (e.g., reconfiguring an existing home insurance policy), and/or follow-up activities and/or conversations that may or may not be contingent upon information discussed during the phone call and/or client enrollment and/or reconfiguration of the client's existing enrollment in services.

Referring still to FIG. 3, it is contemplated herein that, in one or more embodiments, at any time in the process 100 of the customer's interaction, responsibility for the customer interaction as well as a screen that may include the customer's information and/or the conversation plan, may be transferred from one representative to another representative (step 1008). For example, if the customer requests specific details about life insurance policies in the customer's state of residence, the call may be transferred to a specialist that is familiar with the questions and/or issues that the customer may present. In this example, the "transfer" button 617 (see FIG. 5 H) may be selected in the graphical user interface (GUI) of the first representative, and automatically the customer's phone call may be transferred to the second representative, and the second representative's computer's GUI may include the customer's information as well as displaying possible insurance options that the customer may be interested in. Further, it is contemplated herein that the second representative may first be conferenced into the phone call, and after an introduction is made, the first representative may exit the phone call.

Figure 6:
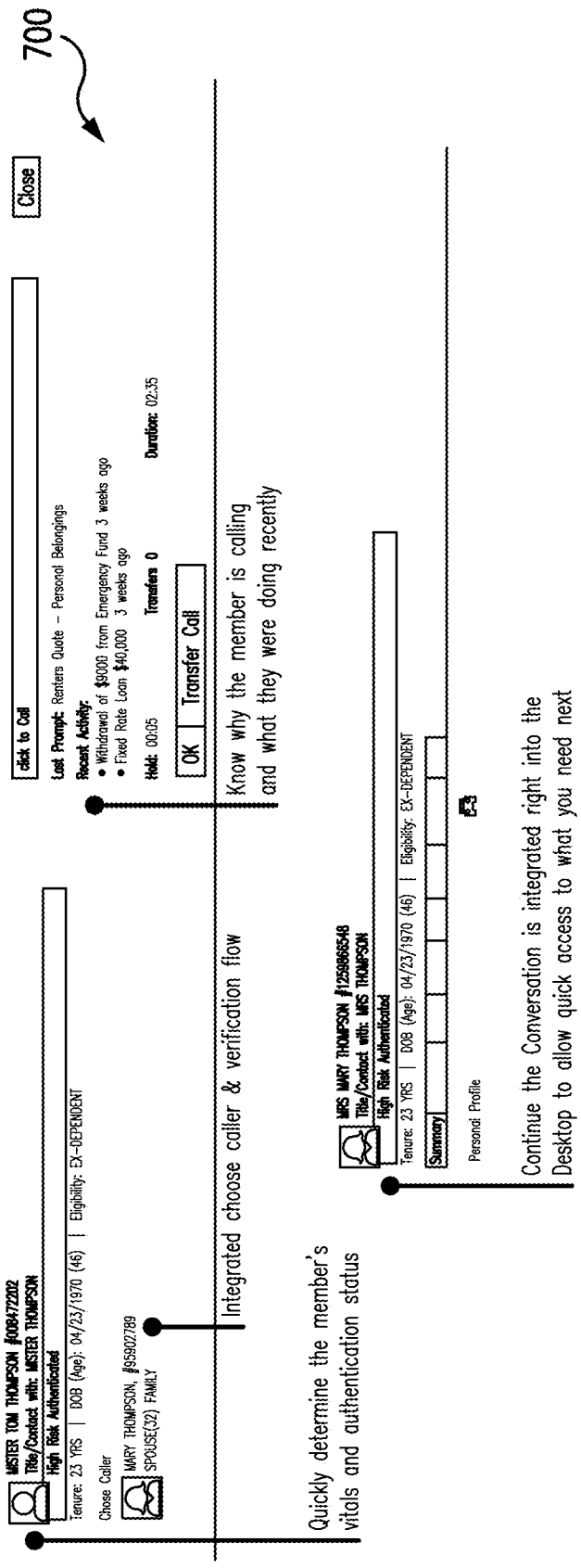
FIG. 6 is still another exemplary screen shot for review by and interaction with a customer service representative in accordance with the subject technology.

For example, FIG. 6 illustrates a portion 700 of a screen shot presented to at least the second customer service representative during a call transfer. The portion 700 may be integrated into previous screens discussed herein or presented as part of a separate screen. The portion 700 includes information to allow for determining the customer's status, last prompt, recent activities and why the interaction is being transferred. Upon getting up to speed, the second customer service representative can select the transfer call button 702.

Figure 7:
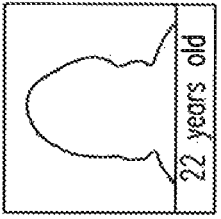
FIG. 7 is still another exemplary screen shot for review by and interaction with a customer service representative in accordance with the subject technology.

Referring to FIG. 7, an example of a pop-up call transfer synthesis area 800 is shown. Again, the call transfer synthesis area 800 may be automatically provided to both of the involved customer service representatives upon selection of the call transfer option. The call transfer synthesis area 800 includes the reason for the transfer and additional background information about the customer.

Whether it be the first or the second customer service representative reviewing the information related to a customer, each customer service representative can access the split screen shot 500 as shown for example in FIG. 5A. The system 100 presents split screen shots at various times in the process 1000 either automatically or by request of the customer service representative.

As can be seen, it is recognized that the customer service representatives will have different skill and experience levels. Thus, the system 100 may display different conversation plan items based on the skills, training and experience of the customer service representative. Additionally, the education and/or work history of the customer can impact the conversation plan/screens presented to the customer service representative(s).

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprise", "include", and conjugations thereof are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention as defined by the appended claims.

What is claimed is:

1. A computer-implemented method for sharing computer screen content between a first computer having a display and at least a second computer having a display, comprising the steps of:
   providing on the first computer a display defined with first and second sections;
   providing web page content in the second section that is only accessible by a user of the first computer which second section web page content includes data generated by the first computer user based upon interaction between the first computer user and a user of the second computer; and moving, at the instruction of the first computer user, selected content from the second section to the first section of the first computer so as to be shared and viewable as web page content on the second computer.

2. The computer implemented method of claim 1, further including:

receiving and storing data related to the at least second computer user at the first computer; and commencing telephonic interaction between respective users of each first and at least one other computer in association with the data received and stored at the first computer.

3. The computer implemented method of claim 2, further including:

commencing a Web session on a Web site for the first computer;

displaying at least a part of the data on the first computer as a first Web page, wherein the first Web page includes at least one selectable link to a second Web page; and selecting the at least one selectable link by the first computer user to display the second Web page.

4. The computer-implemented method of claim 3, wherein the first Web page includes a plurality of links.

5. The computer-implemented method of claim 3, wherein the first Web page includes a link to transfer responsibility for the interaction to another user of the first computer.

6. The computer-implemented method of claim 3, wherein the first Web page includes a link to create follow-up items.

7. The computer-implemented method of claim 3, wherein the second Web page is auto-populated with the data.

8. The computer-implemented method of claim 1, wherein the first and at least second computer are coupled to one another via the Internet.

9. A computer system comprising:

memory storing data, applications and software modules; and a processor connected to the memory and configured to:

provide a display associated with the computer system defined by first and second sections;

provide web page content in the second section accessible only by a user of the computer system which second section web page content includes data generated based upon interaction with a user of the at least one other computer; and move, at the instruction of the computer system user, selected content from the second section to the first section so as to be shared and viewable as web page content on the at least one other computer.

10. The computer system of claim 9, wherein data relating to a user of the at least one other computer is received and stored in the memory of the computer system.

11. The computer system of claim 9, wherein a Web session is commenced on a Web site and at least a portion of the data is displayed on the computer system as a first Web page, wherein the first Web page includes at least one selectable link to a second Web page and the at least one selectable link is selected by the user of the computer system to display the second Web page.

12. The computer system of claim 9, wherein the computer system and the least one other computer are coupled to one another via the Internet.

13. The computer system of claim 11, wherein the first Web page includes a plurality of links.

* * * * *